US006207261B1

(12) United States Patent
Kuwabara et al.

(10) Patent No.: US 6,207,261 B1
(45) Date of Patent: *Mar. 27, 2001

(54) ELECTRICAL INSULATING LAMINATED PAPER, PROCESS FOR PRODUCING THE SAME OIL-IMPREGNATED POWER CABLE CONTAINING THE SAME

(75) Inventors: Hidemitsu Kuwabara; Katsuhiko Katayama, both of Shizuoka; Toru Tsujioka, Tokyo; Ryosuke Hata, Osaka; Hiroshi Takigawa, Osaka; Jun Yorita, Osaka, all of (JP)

(73) Assignees: Tomoegawa Paper Co., Tokyo; Sumitomo Electric Industries, Ltd., Osaka, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,197

(22) Filed: Nov. 18, 1997

(30) Foreign Application Priority Data

Nov. 18, 1996 (JP) ........................................ P8-321192
Oct. 14, 1997 (JP) ........................................ 9-295040

(51) Int. Cl.$^7$ ........................................ B32B 7/02

(52) U.S. Cl. .......................... 428/213; 428/513; 428/377; 428/379; 174/120 FP; 174/110 PM

(58) Field of Search ...................... 174/120 FP, 120 SC, 174/25 R, 110 PM; 428/511, 512, 513, 537.5, 213, 377, 379; 162/124, 132, 138

(56) References Cited

U.S. PATENT DOCUMENTS

| | | | |
|---|---|---|---|
| 3,775,549 | 11/1973 | Matsuda et al. . | |
| 4,571,357 | 2/1986 | Hata et al. . | |
| 4,673,607 | 6/1987 | Hata et al. . | |
| 4,859,804 * | 8/1989 | Hata et al. ......................... | 174/25 R |
| 5,481,070 | 1/1996 | Hirose et al. . | |

FOREIGN PATENT DOCUMENTS

| | | |
|---|---|---|
| 1402612 | 8/1975 | (GB) . |
| 55057209 * | 4/1980 | (JP) . |

OTHER PUBLICATIONS

Database WPI Section Ch, Week 8147 Derwent Publications Ltd., London, GB; Class A85, AN 81–86334D XP002073866 & JP 56 130015 A (Fujikura Cable Works Ltd).

Database WPI Section Ch, Week 8023 Derwent Publications Ltd., London, GB; Class A17, AN 80–40735C XP002073867 & JP 55 057209 A (Fujikura Cable Works Ltd).

Database WPI Section Ch, Week 8218 Derwent Publications Ltd., London, GB; Class A85, AN 82–35957E XP002073868 & JP 57 050718 A (Sumitomo Electric Inc Co).

Database WPI Section Ch, Week 8143 Derwent Publications Ltd., London, GB; Class A17, AN 81–78528D XP002073869 & JP 56 115247 A (Sumitomo Electric Inc Co).

Database WPI Section Ch, Week 8106 Derwent Publications Ltd., London, GB; Class A85, AN 81–08843D XP002073870 & JP 55 155420 A (Fujikura Cable Works Ltd).

Database WPI Section Ch, Week 7927 Derwent Publications Ltd., London, GB; Class A17, AN 79–50066B XP002073871 & JP 54 066498 A (Sumitomo Electric Inc Co).

Patent Abstracts of Japan vol. 003, No. 123 (C–061), Oct. 16, 1979 & JP 54 101887 A (Showa Electric Wire & Cable Co Ltd), Aug. 10, 1979.

Patent Abstracts of Japan vol. 097, No. 006, Jun. 30, 1997 & JP 09 035562 A (Fujikura Ltd), Feb. 7, 1997.

* cited by examiner

*Primary Examiner*—Bruce H. Hess
*Assistant Examiner*—B. Shewareged
(74) *Attorney, Agent, or Firm*—Pillsbury Winthrop LLP

(57) ABSTRACT

Disclosed is an electrical insulating laminated paper prepared by a process which comprises the steps of melt-extruding a polyolefin resin as a binder onto one or two sheets of a kraft insulating paper by means of a extruder to obtain a laminated paper, and calendering or supercalendering the laminated paper so that the total thickness thereof is from 30 to 200 $\mu$m and the proportion of a polymer comprising the polyolefin resin is from 40 to 90%. The laminated paper is excellent in dielectric properties, dielectric strength, and mechanical properties such as adhesive strength.

13 Claims, 2 Drawing Sheets

| | |
|---|---|
| KRAFT INSULATING PAPER LAYER ( $\varepsilon_k$, $\tan\delta_k$) | 27 |
| POLYOLEFIN FILM LAYER ( $\varepsilon_p$, $\tan\delta_p$) | 28 |
| KRAFT INSULATING PAPER LAYER ( $\varepsilon_k$, $\tan\delta_k$) | 27 |

ELECTRICAL INSULATING LAMINATED PAPER, PROCESS FOR PRODUCING THE SAME OIL-IMPREGNATED POWER CABLE CONTAINING THE SAME

FIELD OF THE INVENTION

The present invention relates to an electrical insulating laminated paper excellent in dielectric properties, dielectric strength and mechanical properties, particularly adhesive strength, a process of producing the laminated paper, and an oil-impregnated power cable containing the laminated paper.

BACKGROUND OF THE INVENTION

In recent years, it has been a common practice to install 275 to 500 kV level power cables with the growing power demand. Examples of the power cables which have been put into practical use include conventional kraft insulating paper OF or POF cables, so-called semisynthetic paper (laminated paper)-insulated extrahigh voltage OF or POF cables such as silicon-grafted polyethylene laminated paper (SIOLAP)-insulated OF cable, polypropylene-laminated paper (PPLP)-insulated OF cable, PPLP-insulated POF cable, biaxially-oriented polypropylene-laminated paper (OPPL)-insulated OF cable, OPPL-insulated POF cable and ethylene tetrafluoride-polypropylene hexafluoride-laminated paper (FEP)-insulated OF cable, and crosslinked polyethylene-insulated CV cables. Particularly, it is confirmed that polypropylene-laminated paper-insulated OF cable can be put into practical use as 800 kV OF cable.

Furthermore, insulating materials for solid or mass-impregnated cable are now under extensive examination.

The future tendency in requirements for power cable is for higher transmission capacity, higher applied voltage and longer distance of power transmission. In order to meet this demand, it is necessary that the proportion of the plastic film layer in a sheet of a semisynthetic paper be raised so that the barrier properties against electrical stress of the semisynthetic paper can be enhanced, compensating the difficulty in the enhancement of dielectric strength due to the porosity of the paper and hence providing a high dielectric strength. To this end, it is necessary to provide a sandwiched structure obtained by gluing a kraft paper to both surfaces of a plastic sheet or a one-sided structure obtained by laminating a sheet of a plastic sheet and a sheet of a kraft paper in order to reduce the total thickness of a sheet of the semisynthetic paper, whereby the thickness of the insulating layer in the cable is reduced, thereby providing a compact cable, and thereby the length of the cable having the laminated paper wound therein is increased. One of great difficulties in the preparation of these laminated papers is how to physically glue the kraft insulating paper to the polymer layer with sufficient adhesive strength.

Since the cellulosic fiber constituting the kraft insulating paper has no heat-fusibility, it cannot be molten or chemically bonded or glued to the polyolefin resin film layer at the temperature where the polyolefin resin to be laminated therewith is melt-extruded into film. In other words, the general mechanism of bonding of the cellulose fiber constituting the kraft paper to the melt-extruded film of polyolefin resin is a so-called anchoring effect involving the entry of a high temperature molten polyolefin resin into fine porous spaces produced by the entanglement of cellulose fibers on the surface of the kraft insulating paper.

However, the conventional process for the preparation of a laminated paper which comprises simply melt-extruding a polyolefin resin onto a kraft insulating paper to effect adhesion by means of heat melting of such polyolefin resin is disadvantageous in that the kraft paper is easily peeled off the polyolefin resin film at a step of applying the laminated paper thus prepared to a power cable as an insulating layer and the laminated paper thus obtained is also liable to peeling even after wound on a conductor and impregnated with an insulating oil. The resulting cable has deteriorated properties and thus lacks reliability from the standpoint of long-term stability of insulation.

In order to prevent the insulating paper from being peeled off the polyolefin resin film, it may be proposed to use a technique of coating the surface of the kraft insulating paper with an anchor coat agent such as isocyanate or a corona treatment technique, which has been put into practical use in the art of packaging material. However, such an anchor coat agent is a polar material and therefore has a disadvantage in that it deteriorates the dielectric properties of the electrical insulating laminated paper. Further, the corona treatment technique is disadvantageous in that it makes pinholes in the kraft insulating paper or causes the generation of functional groups (polar groups) such as carbonyl group, carboxyl group and amino group on the surface of the kraft insulating paper which then deteriorate the dielectric properties of the electrical insulating laminated paper. Thus, the corona treatment technique is unsuitable for insulating materials for high voltage apparatus requiring a low dielectric dissipation factor.

As an approach for enhancing the dielectric strength by raising the proportion of the plastic film layer in a sheet of a semisynthetic paper, the reduction of the thickness of the kraft insulating paper forming the laminated paper has been proposed (see JP-B-61-45328 (The term "JP-B" as used herein means an "examined Japanese patent publication")). In general, an easy method for providing a thin laminated paper is to select a thin kraft paper.

A capacitor paper belongs to the group of thin kraft papers. It is said that the lower limit of the thickness of the capacitor paper is from 6 to 7 $\mu$m. In general, a thin capacitor paper is prepared by a process which comprises raising the beating degree of a pulp, making a base paper from the pulp, and then subjecting the base paper to secondary processing, i.e., calendering or supercalendering which is even more effective for provision of smoothness. The product thus obtained is a paper having apparently small unevenness and high smoothness. From the standpoint of properties, this paper has a high density and a high air permeability.

As previously mentioned, the mechanism of bonding of the kraft insulating paper to the molten polyolefin film layer is an anchoring effect alone. However, in the production of the thin capacitor paper, calendering or supercalendering is indispensable as described above, and the thus-prepared thin capacitor paper does not have surface unevenness sufficiently. Therefore, when the molten polyolefin resin is laminated with the thin capacitor paper, anchoring effect cannot be exerted since there is an extremely small amount of porous pits into which the molten resin can enter. As a result, only a laminated paper having a low adhesive strength can be obtained. In other words, the prior art techniques have a disadvantage in that the use of a thin kraft insulating paper gives an insufficient adhesive strength with the plastic film layer to be laminated therewith.

SUMMARY OF THE INVENTION

These problems can be solved by the following aspects of the present invention.

The first aspect of the present invention provides an electrical insulating laminated paper comprising one or two sheets of a kraft insulating paper and a plastic film layer of a polyolefin resin integrated by melt extrusion, which has been calendered or supercalendered, whereby the total thickness thereof is from 30 to 200 μm and the proportion of a plastic film layer comprising the polyolefin resin is from 40 to 90%, and a process of producing an electrical insulating laminated paper, which comprises the steps of:

melt-extruding a polyolefin resin as a binder onto one or between two sheets of a kraft insulating paper by means of a extruder to obtain a laminated paper, and calendering or supercalendering the laminated paper so that the total thickness thereof is from 30 to 200 μm and the proportion of a plastic film layer comprising the polyolefin resin is from 40 to 90%.

The polyolefin resin is preferably selected from polyethylene, polypropylene, an ethylene-propylene copolymer or polybutene. The calendering or supercalendering may be carried out either on-machine or off-machine (i.e., on-line or off-line).

The second aspect of the present invention concerns an oil-impregnated power cable, comprising an insulating layer at least a part of which is formed by winding the electrical insulating laminated paper according to the first aspect. It is preferred that the insulating layer is subjected to heat treatment during or after impregnation with an insulating oil.

The oil-impregnated power cable will be further described hereinafter mainly with reference to OF cable. Examples of OF cable include all (d.c. and a.c.) oil-impregnated power cables such as OF cable (or self-contained OF cable) impregnated with an insulating oil having a relatively low viscosity which is always supplied from an oil feeding apparatus provided at one or both ends of the cable line so that the insulating layer is kept under a positive pressure by the insulating oil, POF cable (high-pressure pipe-type OF cable) prepared by inserting a cable core (assembly of cable constituents without the metallic sheath plastic jacket) into a steel pipe which has been previously installed, evacuating the steel pipe, and then filling the steel pipe with an insulating oil having a slightly higher viscosity than that of insulating oil for OF cable, solid cable (mass-impregnated cable or MI cable) being impregnated with an insulating oil having a higher viscosity than that of insulating oil for POF cable, covered with a metallic sheath, and free of oil feeder and non-draining cable (mass-impregnated non-draining cable or MIND cable) impregnated with an insulating oil which has been mixed with a wax or the like to have a higher viscosity than that of insulating oil for solid cable. In some cases, solid cable designates both MI cable and MIND cable.

BRIEF DESCRIPTION OF THE DRAWINGS

By way of example and to make the description more clear, reference is made to the accompanying drawings in which:

FIG. 2(*b*) is an enlarged sectional view illustrating the condition of calendered laminated paper of the present invention;

FIG. 2(*c*) is an enlarged sectional view illustrating the structure of a laminated paper obtained according to a conventional process;

DETAILED DESCRIPTION OF THE INVENTION

Figure 1:
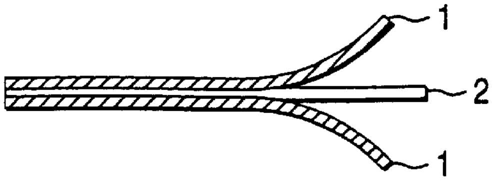
FIG. 1 is a sectional view illustrating the structure of a laminated paper obtained according to the present invention.

In accordance with the present invention, an electrical insulating laminated paper which exhibits basic properties of thin capacitor paper while maintaining an excellent adhesive strength can be obtained. Referring to the structure of the electrical insulating laminated paper of the present invention, a kraft insulating paper 1 and a polyolefin resin 2 are firmly bonded to each other as shown in FIG. 1. Two sheets of the kraft insulating paper 1 may be used as shown in FIG. 1. Alternatively, one sheet of the kraft insulating paper 1 may be used.

The laminated paper obtained according to the present invention and the laminated paper obtained by the conventional method will be further described hereinafter in connection with FIGS. 2(*a*) to 2(*c*).

Figure 2:
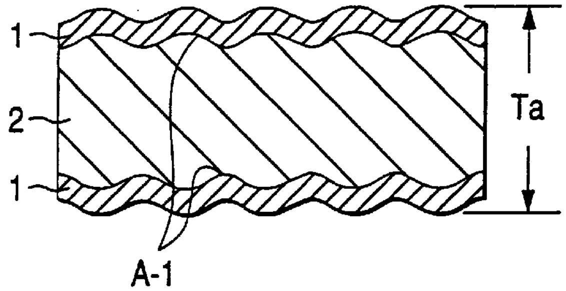
FIG. 2(*a*) is an enlarged sectional view illustrating the condition of uncalendered laminated paper of the present invention.
Figure 2:
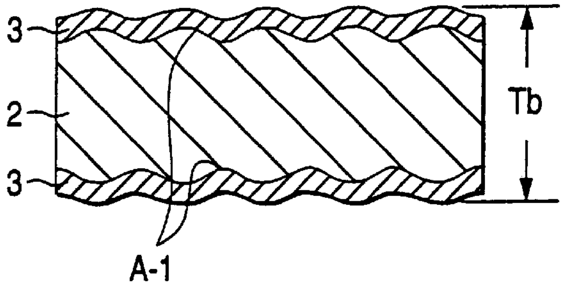
Figure 2:
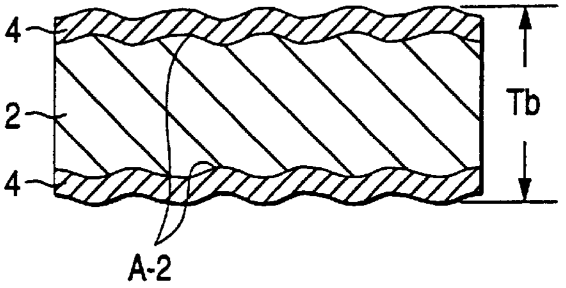

In accordance with the present invention, a laminated paper having a thickness of Ta comprising a melt-extruded polyolefin film layer 2 provided interposed between two sheets of a low density kraft insulating paper 1, 1 having a pockmarked unevenness surface A-1 as shown in FIG. 2(*a*) is supercalendered to obtain a laminated paper having a thickness of Tb as shown in FIG. 2(*b*). As a result, the kraft insulating paper 1, 1 as shown in FIG. 2(*b*) has a smooth outer surface while maintaining a pockmarked unevenness surface A-1 inside. Further, the thickness Tb is smaller than the thickness Ta.

While the thickness of the unsupercalendered kraft insulating paper 1 as shown in FIG. 2(*a*) is greater than that of the supercalendered kraft insulating paper 3, the thickness of the polyolefin film layer provided interposed therebetween remains the same.

In accordance with the prior art, the laminated paper having the foregoing thickness of Tb is prepared by laminating a thin high density kraft insulating paper 4 having a smooth surface A-2, which has been previously supercalendered, with a melt-extruded polyolefin film layer 2 as shown in FIG. 2(*c*).

As a result, the smoothness of the kraft insulating paper of the present invention on the side thereof (A-1) which comes in contact with the melt-extruded polyolefin film layer 2 is lower than that of the kraft insulating paper of the prior art (A-2). Thus, the kraft insulating paper of the present invention has an excellent adhesion with the interface with polyolefin resin layer because it has a rough A-1 surface.

Embodiments of the laminated paper of the present invention will be described hereinafter.

The proportion of plastic film layer (hereinafter referred to as "percent film layer proportion"), i.e., the proportion of polyolefin film layer incorporated in the laminate, can be calculated by the following equation:

$$\text{Percent Film Layer Proportion} = T_1/T_2 \times 100\%$$

where $T_1$: thickness of film layer ($T_1$=W/D in which W is the weight of film layer (g/m$^2$), and D is the density of film layer (g/cm$^3$)

$T_2$: total thickness of laminated paper

In general, the density of polypropylene is about 0.9 (g/cm$^3$).

The adhesive strength was measured by the following method.

Figure 3:
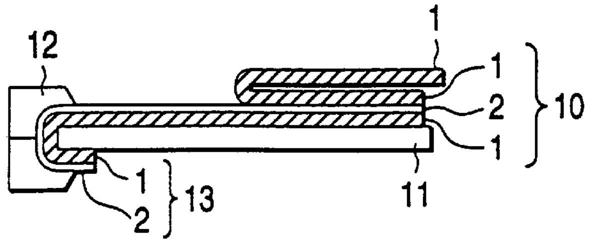
FIG. 3 is a sectional view illustrating a peeling test.

As shown in FIG. 3, a specimen 10 is attached to a support 11 made of a metal plate. Subsequently, a paper layer 1 is partly peeled of the laminate, and then attached to the lower grip of a Tensilon type universal tension testing machine. The rest 13 (melt-extruded layer 2+paper layer 1) of the laminate is fixed to the upper grip of the tension testing machine. The lower grip is then pulled downward at a rate of 100 mm/min. with the peel angle being kept at 180° so that the paper 1 is peeled off the melt-extruded layer 2. For the calculation of adhesive strength, among the measurements of 100 mm peeled area drawn on the chart, the strength required for peeling of central 50 mm area is averaged. The average value is then reduced per 15 mm of width.

Figures 4, 5:
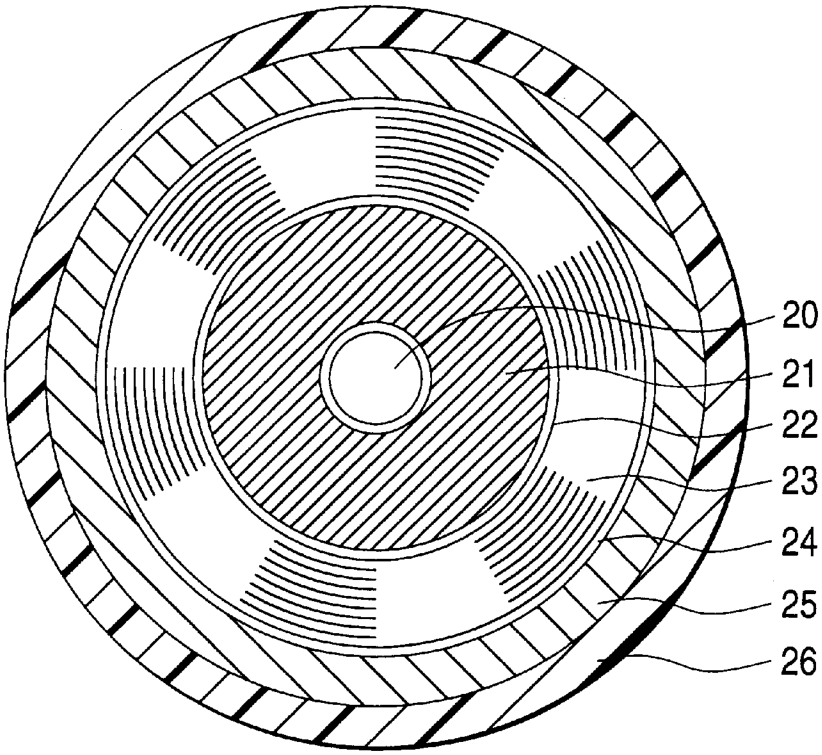
FIG. 4 is a sectional view illustrating an embodiment of OF cable according to the present invention.
FIG. 5 is a sectional view illustrating the structure and electrical properties of the laminated paper obtained according to the present invention, wherein the reference numeral 1 indicates a kraft insulating paper, the reference numeral 2 indicates a melt-extruded polyolefin film layer, the reference numeral 3 indicates a calendered or supercalendered kraft insulating paper, the reference numeral 4 indicates a pre-supercalendered kraft insulating paper, the reference numeral 11 indicates a support, the reference numeral 12 indicates an upper grip, the reference numeral 13 indicates the rest of the laminate, the reference numeral A-1 indicates the inner surface of unsupercalendered or supercalendered kraft insulating paper in the laminated paper of the present invention, the reference numeral A-2 indicates the inner surface of a kraft insulating paper obtained according to a conventional process, the reference numeral 20 indicates an oil passage, the reference numeral 21 indicates a stranded conductor, the reference numeral 22 indicates an inner shield layer, the reference numeral 23 indicates an insulating layer, the reference numeral 24 indicates an outer shield layer, the reference numeral 25 indicates a metallic sheath, the reference numeral 26 indicates a corrosion-resistant layer, the reference numeral 27 indicates a kraft insulating paper having a dielectric constant of $\epsilon_k$ and a dielectric dissipation factor of tan $\delta_k$, and the reference numeral 28 indicates a polyolefin film layer having a dielectric constant of $\epsilon_p$ and a dielectric dissipation factor of tan $\delta_p$.

An embodiment of the oil-impregnated power cable comprising the electrical insulating laminated paper obtained according to the present invention will be described hereinafter with reference to single-core OF cable in connection with FIG. 4. FIG. 4 is a cross-sectional view of an example of single-core OF cable. Provided at the core of the single-core OF cable is an oil passage 20 around which a stranded conductor 21 such as copper wire, an inner shield layer 22, an insulating layer 23 and an outer shield layer 24 are provided in this order. On the outer circumference, a metallic sheath 25 and a corrosion-resistant layer 26 are provided in sequence. At least a part of the insulating layer 23 is composed of the electrical insulating laminated paper of the present invention wound around the core of the power cable. FIG. 2(*b*) is an enlarged sectional view of the electrical insulating laminated paper obtained according to the present invention. Provided at the center of the laminate is a polyolefin film layer 2 sandwiched by upper and lower kraft paper layers 1, 1. The insulating layer 23 is impregnated with an insulating oil which is pressurized thereinto from the oil passage 20.

The process for the preparation of laminated paper will be described hereinafter in the following examples and comparative examples.

EXAMPLE 1

Two sheets of a kraft insulating paper having a thickness of 20 μm, a density of 0.70 g/cm$^3$ and an air permeability of 2,500 sec/100 ml were laminated with a molten polypropylene as a binder according to the following polypropylene extrusion process to prepare a laminated paper (PPLP) having a total thickness of 115 μm, a percent film layer (polypropylene film layer) proportion of 64% and a water content of 6%.

The paper layer in PPLP thus obtained was supplied with water by a damping apparatus off-machine until the water content thereof reached 14%. PPLP was then supercalendered (16-stage supercalender composed of metal rolls and elastic rolls) so as to provide a total thickness of 100 μm and a percent film layer proportion of 74%. Thus, an electrical insulating laminated paper of the present invention was obtained.

The adhesive strength of the paper layer with the melt-extruded layer before and after supercalendering (hereinafter referred to as "adhesive strength of dry paper") were measured, and the adhesive strength of dry paper before and after supercalendering were 100 gf/15 mm and 115 gf/15 mm, respectively. Next, the adhesive strength of oil-impregnated paper was measured after PPLP was subjected to ageing test at a temperature of 100° C. in an alkylbenzene oil which is used in OF cable for 24 hours. The oil-impregnated PPLP exhibited an adhesive strength of 95 gf/15 mm. These values prove that the laminated paper does not cause any problems under actual operating conditions.

EXAMPLE 2

Two sheets of a kraft insulating paper having a thickness of 20 μm, a density of 0.70 g/cm$^3$ and an air permeability of 2,500 sec/100 ml were laminated with a molten polypropylene as a binder according to the following polypropylene extrusion process to prepare a PPLP having a total thickness of 139 μm, a percent film layer proportion of 79% and a water content of 6%.

The paper layer in PPLP thus obtained was supplied with water by a damping apparatus off-machine until the water content thereof reached 14%. PPLP was then supercalendered in the same manner as in Example 1 so as to provide a total thickness of 129 μm and a percent film layer proportion of 86%. Thus, a thin PPLP of the present invention was obtained.

The adhesive strength of dry paper before and after supercalendering were 105 gf/15 mm and 105 gf/15 mm, respectively. PPLP was also subjected to ageing test at a temperature of 100° C. in an alkylbenzene oil which is used in OF cable for 24 hours. The oil-impregnated PPLP exhibited an adhesive strength of 100 gf/15 mm. These values prove that the laminated paper does not cause any problems under actual operating conditions.

EXAMPLE 3

Two sheets of a kraft insulating paper having a thickness of 20 μm, a density of 0.70 g/cm$^3$ and an air permeability of 2,500 sec/100 ml were laminated with a molten polypropylene as a binder according to the following polypropylene extrusion process to prepare a PPLP having a total thickness of 161 μm, a percent film layer proportion of 84% and a water content of 6%.

The paper layer in PPLP thus obtained was supplied with water by a damping apparatus off-machine until the water content thereof reached 14%. PPLP was then supercalendered in the same manner as in Example 1 so as to provide a total thickness of 157 μm and a percent film layer proportion of 86%. Thus, a thin PPLP of the present invention was obtained.

The adhesive strength of dry paper before and after supercalendering each were 110 gf/15 mm. PPLP was also subjected to ageing test at a temperature of 100° C. in an alkylbenzene oil which is used in OF cable for 24 hours. The oil-impregnated PPLP exhibited an adhesive strength of 105 gf/15 mm. These values prove that the laminated paper does not cause any problems under actual operating conditions.

EXAMPLE 4

Two sheets of a kraft insulating paper having a thickness of 25 μm, a density of 0.72 g/$cm^3$ and an air permeability of 3,000 sec/100 ml were laminated with a molten polypropylene as a binder according to the following polypropylene extrusion process to prepare a PPLP having a total thickness of 113 μm, a percent film layer proportion of 59% and a water content of 6%.

The paper layer in PPLP thus obtained was supplied with water by a damping apparatus off-machine until the water content thereof reached 14%. PPLP was then supercalendered in the same manner as in Example 1 so as to provide a total thickness of 105 μm and a percent film layer proportion of 64%. Thus, a thin PPLP of the present invention was obtained.

The adhesive strength of dry paper before and after supercalendering each were 90 gf/15 mm. PPLP was also subjected to ageing test at a temperature of 100° C. in an alkylbenzene oil which is used in OF cable for 24 hours. The oil-impregnated PPLP exhibited an adhesive strength of 80 gf/15 mm. These values prove that the laminated paper does not cause any problems under actual operating conditions.

EXAMPLE 5

Two sheets of a kraft insulating paper having a thickness of 25 μm, a density of 0.72 g/$cm^3$ and an air permeability of 3,000 sec/100 ml were laminated with a molten polypropylene as a binder according to the following polypropylene extrusion process to prepare a PPLP having a total thickness of 136 μm, a percent film layer proportion of 66% and a water content of 6%.

The paper layer in PPLP thus obtained was supplied with water by a damping apparatus off-machine until the water content thereof reached 14%. PPLP was then supercalendered in the same manner as in Example 1 so as to provide a total thickness of 129 μm and a percent film layer proportion of 68%. Thus, a thin PPLP of the present invention was obtained.

The adhesive strength of dry paper before and after supercalendering each were 95 gf/15 mm. PPLP was also subjected to ageing test at a temperature of 100° C. in an alkylbenzene oil which is used in OF cable for 24 hours. The oil-impregnated PPLP exhibited an adhesive strength of 80 gf/15 mm. These values prove that the laminated paper does not cause any problems under actual operating conditions.

EXAMPLE 6

Two sheets of a kraft insulating paper having a thickness of 25 μm, a density of 0.72 g/$cm^3$ and an air permeability of 3,000 sec/100 ml were laminated with a molten polypropylene according to the following polypropylene extrusion process to prepare a laminated paper (PPLP) having a total thickness of 168 μm, a percent film layer proportion of 71% and a water content of 6%.

The paper layer in PPLP thus obtained was supplied with water by a damping apparatus off-machine until the water content thereof reached 14%. PPLP was then supercalendered (16-stage supercalender composed of metal rolls and elastic rolls) so as to provide a total thickness of 159 μm and a percent film layer proportion of 75%. Thus, a thin PPLP of the present invention was obtained.

The adhesive strength of dry paper before and after supercalendering were 110 gf/15 mm and 105 gf/15 mm, respectively. PPLP was also subjected to ageing test at a temperature of 100° C. in an alkylbenzene oil which is used in OF cable for 24 hours. The oil-impregnated PPLP exhibited an adhesive strength of 95 gf/15 mm. These values prove that the laminated paper does not cause any problems under actual operating conditions.

COMPARATIVE EXAMPLE 1

Two sheets of a thin capacitor paper having a thickness of 15 μm, a density of 1.09 g/$cm^3$ and an air permeability of not less than 100,000 sec/100 ml were calendered, and then laminated with a molten polypropylene as a binder by a polypropylene extrusion process to obtain a comparative thin PPLP having a total thickness of 100 μm and a percent film layer proportion of 74%. The adhesive strength of dry paper of PPLP thus obtained was only 14 gf/15 mm. The resulting PPLP underwent complete peeling during or after dipping in an alkylbenzene oil.

COMPARATIVE EXAMPLE 2

Two sheets of a thin capacitor paper having a thickness of 15 μm, a density of 1.09 g/$cm^3$ and an air permeability of not less than 100,000 sec/100 ml were laminated with a molten polypropylene as a binder in the same manner as in Comparative Example 1 to obtain a comparative thin PPLP having a total thickness of 128 μm and a percent film layer proportion of 75%.

The adhesive strength of dry paper of PPLP thus obtained was only 15 gf/15 mm. The PPLP exhibited an adhesive strength of only 1 gf/15 mm during or after dipping in an alkylbenzene oil.

COMPARATIVE EXAMPLE 3

Two sheets of a thin capacitor paper having a thickness of 15 μm, a density of 1.09 g/$cm^3$ and an air permeability of not less than 100,000 sec/100 ml were laminated with a molten polypropylene as a binder in the same manner as in Comparative Example 1 to obtain a comparative thin PPLP having a total thickness of 155 μm and a percent film layer proportion of 81%.

The adhesive strength of dry paper of the PPLP was only 17 gf/15 mm. The PPLP exhibited an adhesive strength of only 2 gf/15 mm during or after dipping in an alkylbenzene oil.

COMPARATIVE EXAMPLE 4

Two sheets of a thin capacitor paper having a thickness of 20 μm, a density of 1.13 g/$cm^3$ and an air permeability of not less than 100,000 sec/100 ml were laminated with a molten polypropylene as a binder in the same manner as in Comparative Example 1 to obtain a comparative thin PPLP having a total thickness of 98 μm and a percent film layer proportion of 64%.

The adhesive strength of dry paper of the PPLP was only 7 gf/15 mm. The PPLP underwent complete peeling during or after dipping in an alkylbenzene oil.

COMPARATIVE EXAMPLE 5

Two sheets of a thin capacitor paper having a thickness of 20 μm, a density of 1.13 g/$cm^3$ and an air permeability of not less than 100,000 sec/100 ml were laminated with a molten polypropylene as a binder in the same manner as in Comparative Example 1 to obtain a comparative thin PPLP having a total thickness of 122 μm and a percent film layer proportion of 72%.

The adhesive strength of dry paper of the PPLP was only 6 gf/15 mm. The PPLP underwent complete peeling during or after dipping in an alkylbenzene oil.

COMPARATIVE EXAMPLE 6

Two sheets of a thin capacitor paper having a thickness of 20 μm, a density of 1.13 g/cm$^3$ and an air permeability of not less than 100,000 sec/100 ml were laminated with a molten polypropylene as a binder in the same manner as in Comparative Example 1 to obtain a comparative thin PPLP having a total thickness of 152 μm and a percent film layer proportion of 77%.

The adhesive strength of dry paper of the PPLP was only 7 gf/15 mm. The PPLP underwent complete peeling during or after dipping in an alkylbenzene oil.

As can be seen in the results of the foregoing examples and comparative examples, the preparation process of the present invention comprises previously preparing a thin PPLP from a low density thin paper, and then supercalendering PPLP thus prepared so that the rough surface of the paper is flattened to reduce the total thickness thereof, whereby the lowering of the adhesive strength can be drastically inhibited. Thus, the preparation process of the present invention is very desirable from the standpoint of mechanical properties.

The results of the foregoing examples and comparative examples are set forth in Table 1.

voltage is desirable regardless of whether it is applied to a.c. or d.c. power cable. The use of the electrical insulating laminated paper of the present invention is favorable for realizing a compact and economical power cable to which a higher voltage can be applied.

In a.c. cable, on the other hand, dielectric loss, which has an great effect on its transmission capacity and transmission loss, increases in proportion to the product of the square of applied voltage and $\epsilon \times \tan \delta$. Therefore, both dielectric constant and dielectric loss are preferably small. This tendency becomes remarkable when the applied voltage is extrahigh (EHV) or ultrahigh (UHV). Accordingly, the application of the electrical insulating laminated paper of the present invention to a.c. cable is very effective.

Various attempts have been made to develop an electrical insulating laminated paper having a higher percent polyolefin film layer proportion than ever. As has been further mentioned herein, however, laminated papers having a sufficient adhesive strength have never been obtained and put into practical use so far.

To be more concrete, one of the factors in determining the insulating performance of a power cable, regardless of whether it is for a.c. or d.c., is if it is highly capable of withstanding impulse voltage. The structure, dielectric constant and dielectric loss of a sheet of a laminated paper will be described hereinafter in connection with FIG. 5. FIG. 5 illustrates the electrical properties (dielectric constant and dielectric dissipation factor) of the polyolefin film layer 28 as $\epsilon_p$ and $\tan \delta_p$, respectively, and of the kraft insulating paper 27 as $\epsilon_k$ and $\tan \delta_k$, respectively.

In general, electric field E (represented by kV/mm; magnitude of voltage applied per mm of insulating layer) is in inverse proportion to dielectric constant ($\epsilon$). Therefore, in

TABLE 1

| | Kraft Insulating Paper | | | PPLP | | | |
|---|---|---|---|---|---|---|---|
| Example No. | Thickness (μm) | Density (g/cm$^3$) | Air Permeability (sec/100 ml) | Thickness (μm) before/after S | % Film Layer Proportion (%) before/after S | Dry Paper Adhesive Strength (gf/15 mm) before/after S | Oil-impregnated Paper Adhesive Strength (gf/15 mm) |
| Example 1 | 20 | 0.70 | 2,500 | 115/100 | 64/74 | 100/115 | 95 |
| Example 2 | 20 | 0.70 | 2,500 | 139/129 | 79/86 | 105/105 | 100 |
| Example 3 | 20 | 0.70 | 2,500 | 161/157 | 84/86 | 110/110 | 105 |
| Example 4 | 25 | 0.72 | 3,000 | 113/105 | 59/64 | 90/90 | 80 |
| Example 5 | 25 | 0.72 | 3,000 | 136/129 | 66/68 | 95/95 | 80 |
| Example 6 | 25 | 0.72 | 3,000 | 168/159 | 71/75 | 110/105 | 95 |
| Comparative Example 1 | 15 | 1.09 | ≧100,000 | 100/— | 74/— | 14/— | 0 |
| Comparative Example 2 | 15 | 1.09 | ≧100,000 | 128/— | 75/— | 15/— | 1 |
| Comparative Example 3 | 15 | 1.09 | ≧100,000 | 155/— | 81/— | 17/— | 2 |
| Comparative Example 4 | 20 | 1.13 | ≧100,000 | 98/— | 64/— | 7/— | 0 |
| Comparative Example 5 | 20 | 1.13 | ≧100,000 | 122/— | 72/— | 6/— | 0 |
| Comparative Example 6 | 20 | 1.13 | ≧100,000 | 152/— | 77/— | 7/— | 0 |

S: supercalendering

In the laminated paper, the polyolefin film layer exhibits a higher dielectric breakdown voltage to a.c., impulse and d.c., and a lower dielectric constant ($\epsilon$) and dielectric dissipation factor ($\tan \delta$) than the kraft insulating paper as a constituent of the laminated paper. The high breakdown order to reduce the electrical field in the weak kraft paper while increasing the electric field in the strong polyolefin film layer, it is preferred that the dielectric constant ($\epsilon_k$) of the kraft paper layer be increased. The laminated paper obtained according to the preparation process of the present invention has kraft paper layers each having a reduced thickness by calendering the laminate and hence compressing the kraft paper layer. As a result, the density of the kraft paper layer is raised, and the dielectric constant of the kraft paper layer is also raised. Since the tendency that dielectric strength of kraft paper layer is lowered by reducing the thickness of kraft paper layer as much as possible is compensated by the rise in dielectric constant, the laminated insulating paper having a high percent polyolefin film layer proportion of the present invention can attain even better performance.

A model cable comprising PPLP obtained in Example 1 was then prepared. The model cable thus prepared was then subjected to electrical tests. The results are set forth in Table 2.

TABLE 2

Evaluation of Model Cable

| | | Example 1 | Comparative Example 1 |
|---|---|---|---|
| PPLP | Type of PPLP | New process paper A | Conventional paper B |
| | % Film Layer Proportion | 74 | 64 |
| Cable Structure | Conductor Diameter (mm) | 20 | 20 |
| | Number of Sheets of Insulating Papers | 15 | 13 |
| | Thickness of Insulating Layer (μm) | 1.50 | 1.50 |
| Electrical Test*[1)] | DC · BD (kV/mm) | 250 | 206 |
| | Imp · BD (kV/mm) | 185 | 175 |

*[1)]Conditions of Voltage Application
Started at 100 kV, stepped up at a rate of 5 kV/5 min. (room temperature, DC)
Started at 100 kV, stepped up at a rate of 5 kV/3 times (room temperature, Imp.)

The papers used for the comparison are a conventional paper B (thickness: 115 μm; percent film layer proportion: 64%) and a new process paper A (thickness: 100 μm; percent film layer proportion: 74%) obtained by supercalendering a conventional paper. As the conductor there was used a stainless steel pipe having a diameter of 20 mmϕ. The conductor was then laminated with a PPLP insulating layer so as to provide a thickness of about 1.5 mm. The laminate was then impregnated with a solid oil (2,000 cSt at ordinary temperature, 30 cSt at 100° C.).

The foregoing model cable was then subjected to DC and impulse breakdown (BD) tests under the following conditions: DC•BD: started at 100 kV, stepped up at a rate of 5 kv/5 min. Imp•BD: started at 100 kV, stepped up at a rate of 5 kV/3 times.

As a result, the new process paper A showed a 23% increase of DC•BD value and a 6% increase of Imp•BD value. This can be attributed to the following fact:

When d.c. voltage is applied across PPLP, the d.c. stress is distributed in proportion to the resistivity (strictly speaking, "resistance") of each constituent, and is therefore imposed almost only on PP portion. A cable prepared from the new process paper A of the present application has a percent PP proportion of 74%, a 16% increase from that of the conventional paper B. Thus, the cable of the present application can be expected to exhibit an increase of DC breakdown value almost corresponding to this proportion. The data thus obtained can thoroughly satisfy this expectation.

When Imp•voltage is applied across PPLP, the stress is separately distributed on PP film layer portion and the kraft portion unlike DC. If PPLP is supercalendered, only the thickness of the kraft paper is compressed, thereby increasing the density of the kraft paper, and as a result, the air impermeability is raised. Since the kraft paper layer portion has a reduced thickness and a raised air impermeability, its Imp•BD stress (kV/mm) is raised. However, the reduction in the thickness of the kraft paper layer portion and the increase in Imp•BD voltage are compensated each other. Thus, the increase in Imp•BD voltage can be expected to be from 0 to a few percent. The data thus obtained can thoroughly satisfy this expectation.

As mentioned above, the use of the new process paper A of the present invention makes it possible to improve the electrical breakdown characteristics of power cable. Thus, a compact power cable with thinner insulation having a high reliability can be realized.

The laminated paper obtained according to the present invention was incorporated as an insulating layer in a power cable, dried, and then impregnated with an insulating oil. At the step of impregnating the insulating layer with an insulating oil, the cable core can be heated to a temperature of, e.g., 100° C. to 120° C., and then allowed to stand at the heating temperature for about 1 week. As a result, a phenomenon which is not observed at a temperature of lower than the maximum allowable temperature for cable (normally about 90° C. or lower) occurred. In other words, it was found that the thickness of the kraft paper layer in the laminated paper which had been reduced by calendering or supercalendering was partly restored. It was thus found that the effective use of this effect makes it possible to intentionally restore from the looseness of the core and the drop of dielectric strength. In some detail, the water content contained in the kraft paper at the time when the laminated paper is wound is removed at the drying step to reduce the thickness of the kraft paper layer. As a result, the insulating layer becomes loose, and the thickness of the oil layer increases, reducing the dielectric strength of the cable. By providing the impregnated cable with a sufficiently high temperature for a sufficiently long period of time (the suitable temperature and the applied period of time depend on to some extent upon the kind of insulating oil), the thickness of the kraft paper layer which has been reduced by calendering or supercalendering can be restored, making it possible to intentionally restore from the looseness of the core as well as the drop of dielectric strength.

It was confirmed that this phenomenon occurs even if the cable which has been impregnated with an insulating oil is heated. This demonstrates that the similar effect can be exerted, even when heat treatment is effected at any step after impregnated with an insulating oil.

This effect provides a technique that can be utilized particularly for laminated insulating paper prepared by the process of the present invention and thus make a great contribution to enhancement of performance of oil-impregnated power cables.

In accordance with the present invention, a laminated paper comprising a relatively thick plastic film layer sandwiched by kraft insulating papers, which cannot be obtained according to the conventional method, can be obtained by a simple process which comprises calendering or supercalendering the laminate. Also in accordance with this process, an unevenness structure can be maintained at the interface of the paper with the plastic film layer, exerting an anchoring effect that allows the paper to be firmly bonded to the polymer. Further, the rise in the percent plastic film layer proportion makes it possible to enhance the dielectric strength of the laminate. Moreover, the total thickness of a sheet of the laminated paper is reduced so that the thickness of the insulating layer in the cable is reduced, making it possible to reduce the cable size and weight. Eventually, the increase of the length of the cable having the laminated paper wound therein can be realized.

Further, by providing the laminated insulating paper of the present invention in at least a part of the insulating layer in the oil-impregnated power cable, a power cable having a high dielectric strength can be realized regardless of whether it is for a.c. or d.c. use. Accordingly, a more compact and economical power cable can be realized.

In the case of a.c. power cable, the higher the applied voltage is, the more remarkable is the effect of lower dielectric loss attained by the power cable. Accordingly, a greater transmission capacity and a smaller transmission loss can be realized, remarkably enhancing the economy.

While the invention has been described in detail and with reference to specific embodiments thereof, it will be apparent to one skilled in the art that various changes and modifications can be made therein without departing from the spirit and scope thereof.

What is claimed is:

1. An insulating laminated paper comprising:

at least one sheet of a kraft insulating paper; and a plastic film layer comprising a polyolefin resin;

said kraft insulating paper and said plastic film layer having been integrated by melt extrusion to form an insulating laminated paper and said insulating laminated paper having been calendered or supercalendered subsequent to said kraft insulating paper and said plastic film layer having been integrated whereby, after having been subjected to said calendering or supercalendering, the laminated paper has at least one sheet of kraft insulating paper having a smooth outer surface and a relatively rough inner surface in contact with said polyolefin resin;

said insulating laminated paper having a thickness of approximately 30 to 200 μm; and said plastic film layer having a thickness of approximately 40 to 90% of the thickness of said insulating laminated paper.

2. The insulating laminated paper of claim 1, wherein the polyolefin resin is selected from the group consisting of polyethylene, polypropylene, an ethylene-propylene copolymer and polybutylene.

3. The insulating laminated paper of claim 1, wherein the calendering or supercalendering is carried out either on-machine or off-machine.

4. The insulating laminated paper of claim 1, wherein the kraft insulating paper has a thickness of less than 30 μm.

5. An insulating laminated paper according to claim 1, comprising two sheets of kraft insulating paper.

6. An oil-impregnated power cable comprising:

a conductor; and an insulating layer at least part of which is formed by winding an insulating laminated paper comprising:

at least one sheet of a kraft insulating paper; and a plastic film layer comprising a polyolefin resin;

said kraft insulating paper and said plastic film layer having been integrated by melt extrusion to form an insulating laminated paper and said insulating laminated paper having been calendered or supercalendered subsequent to said kraft insulating paper and said plastic film layer having been integrated whereby, after having been subjected to said calendering or supercalendering, the laminated paper has at least one sheet of kraft insulating paper having a smooth outer surface and a relatively rough inner surface in contact with said polyolefin resin;

said insulating laminated paper having a thickness of approximately 30 to 200 μm; and said plastic film layer having a thickness of approximately 40 to 90% of the thickness of said insulating laminated paper.

7. The oil-impregnated power cable of claim 6, wherein the kraft insulating paper has a thickness of less than 30 μm.

8. The oil-impregnated power cable of claim 6, wherein the polyolefin resin is selected from the group consisting of polyethylene, polypropylene, an ethylene-propylene copolymer and polybutylene.

9. The oil-impregnated power cable of claim 6, wherein the calendering or supercalendering is carried out either on-machine or off-machine.

10. The oil-impregnated power cable of claim 6, wherein the insulating layer has been subjected to heat treatment during and/or after impregnation with an insulating oil.

11. The oil-impregnated power cable of claim 8, wherein the insulating layer has been subjected to heat treatment during and/or after impregnation with an insulating oil.

12. The oil-impregnated power cable of claim 9, wherein the insulating layer has been subjected to heat treatment during and/or after impregnation with an insulating oil.

13. An insulating laminated paper according to claim 6, comprising two sheets of kraft insulating paper.

* * * * *